April 7, 1942.          W. WORTH                2,279,285
              TEMPERATURE CONTROL UNIT
              Filed April 3, 1939         3 Sheets-Sheet 1
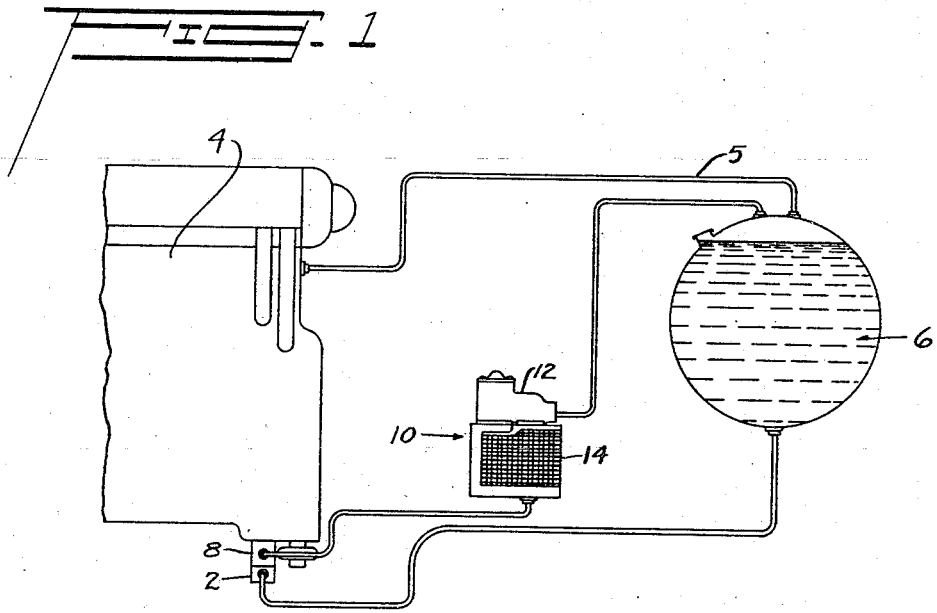
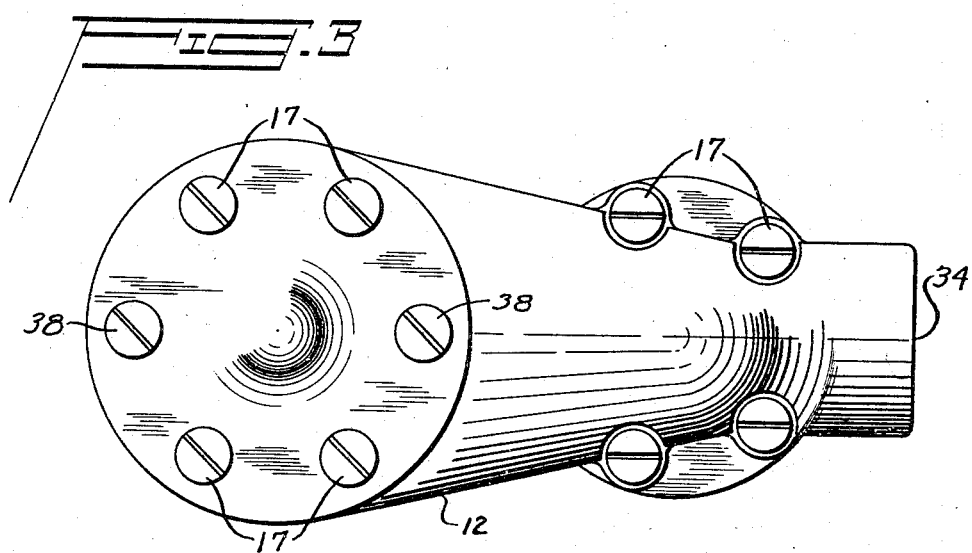

April 7, 1942.  W. WORTH  2,279,285
TEMPERATURE CONTROL UNIT
Filed April 3, 1939  3 Sheets-Sheet 2
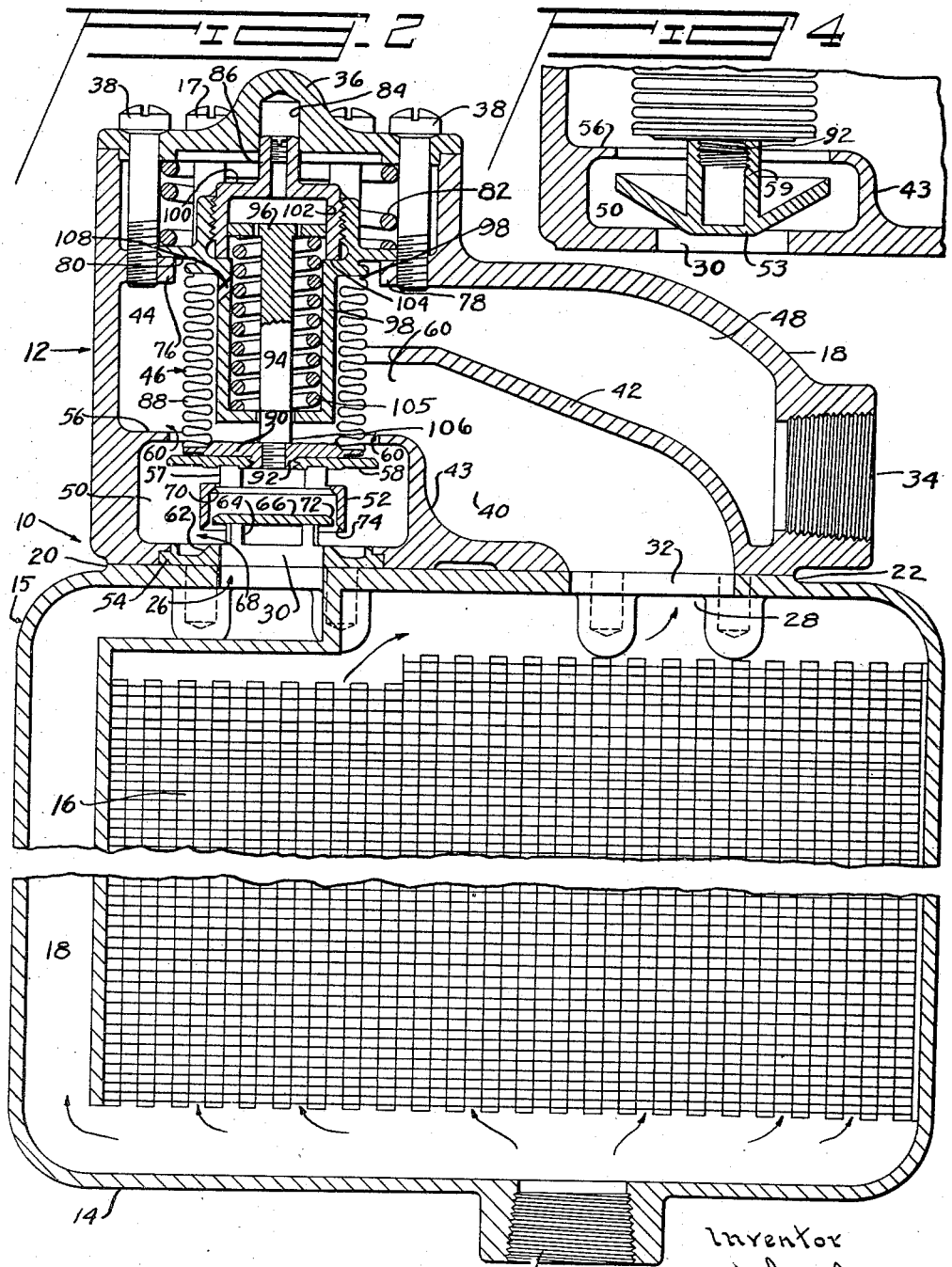

April 7, 1942.                W. WORTH                  2,279,285
                        TEMPERATURE CONTROL UNIT
                          Filed April 3, 1939          3 Sheets-Sheet 3
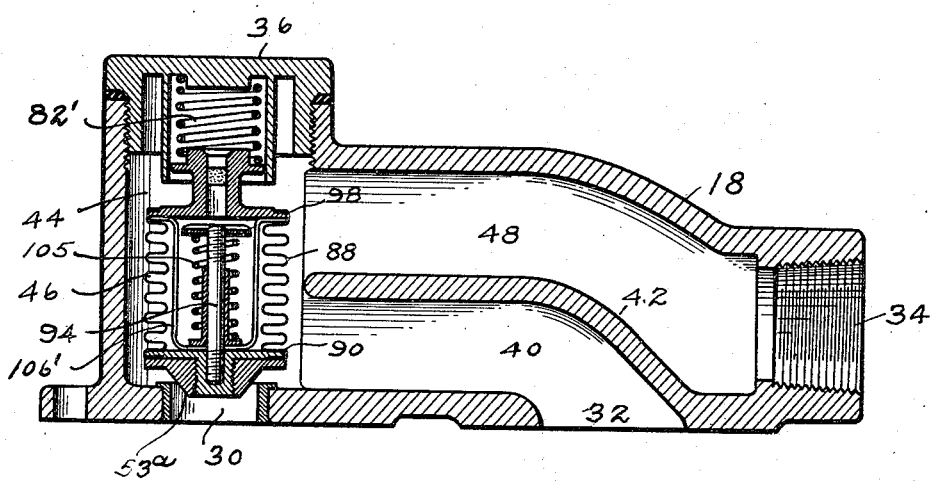
Inventor
Weldon Worth
By F. L. Walker
Attorney Patented Apr. 7, 1942

2,279,285

UNITED STATES PATENT OFFICE 2,279,285

TEMPERATURE CONTROL UNIT

Weldon Worth, Dayton, Ohio

Application April 3, 1939, Serial No. 265,749

12 Claims. (Cl. 236—34)

This invention pertains to regulation and maintenance of temperature of a circulated fluid within a prescribed range of fluctuations thereof, and more particularly to an apparatus and method for automatically varying the flow of a thermo-sensitive liquid in relation with a heat exchange unit to maintain a substantially constant temperature condition under widely varying external temperature conditions.

While for illustrative purpose, but with no intent to unduly limit the scope or application of the invention it is herein shown and described in its application to lubricating systems for engines, for which it is especially adapted, it is to be understood that it is not limited thereto, but is of general application.

In the lubrication system of an aircraft engine or other internal combustion engines it is usually necessary to cool the oil after it passes through the engine to maintain its temperature within safe operating limits.

The oil cooler in such a system must have ample cooling capacity for the most severe or abnormal conditions and will therefore be over capacity for normal operating conditions. If the over-cooling is to be prevented under extreme conditions, it is necessary to have means for limiting the amount of cooling effect according to the operating conditions. Many of the existing oil coolers are designed with a by-pass jacket and accomplish this temperature control by directing the oil through this by-pass jacket when it is too cold instead of through the cooling element of the apparatus. This jacket also keeps the passage through the cooling element sufficiently warm to be clear of congealed oil to permit the re-establishment of oil flow therethrough when cooling is desired.

A problem of temperature control with this type of apparatus is to afford full automatic operation that will control the oil cooling to the desired degree and maintain a predetermined condition of temperature under all the variable conditions existing in airplane operation, and provide maximum compactness, reliability and safety under operating conditions and in event of failure of the device.

Different types of existing temperature control units accomplish some of these objects but fail in combining all of them in one apparatus. For example, it is extremely desirable to have the control go to a cooling position in event of failure. Some existing thermostatic devices accomplish this object by using a sub-atmospheric pressure bellows valve, wherein a leak in the bellows will raise its internal pressure and have the same effect as heat. Where this method has been used, however, the low operating forces impair the reliability. Because of the low operating forces, piston valves have been used which are more susceptible to sticking than poppet valves. Such a valve is also influenced to an undesirable extent by the change in atmospheric pressure with altitude since the atmospheric pressure at 30,000 feet is about one-third that at sea level. Other devices have a high pressure in the bellows to minimize the effect of altitude and permit the use of poppet valves, but these go to a non-cooling position in case of failure.

Another problem is to obtain regulation of the temperature of the oil going into the engine within the cooling capacity of the oil cooler, and at the same time have a simple installation with a minimum of brackets and plumbing.

From an installation standpoint it is very desirable to have the valve an integral part of the cooler. Such devices at the present time, instead of regulating the temperature of the oil into the engine, regulate the temperature of the oil out of the engine (that is, the oil into the cooler) to a substantially constant temperature within the cooling capacity of the unit. Those devices which regulate the temperature of the oil into the engine, which is substantially the oil out of the cooler, do so by mounting the control unit in the circuit between the oil tank and the engine and in this position it regulates the by-pass of the cooler. This type of unit has two separate circuits simultaneously flowing through it.

My invention, therefore, has for one of its objects, to provide a novel method of regulating the temperature of a fluid in a fluid circuit to a substantially constant temperature within the capacity of the equipment, under conditions of varying ambient pressures, varying quantities of fluid flow, and varying pressure drops in elements of the fluid circuit.

It is a further object of my invention to provide a temperature control device in a fluid circuit of the high vapor pressure actuated or equivalent type which will go into the cold or the position inducing cooling in case of a failure of the bellows which forms the pressure chamber.

It is a further object of my invention to provide a compact unit for oil temperature control for use with an internal combustion engine which may be attached directly to the oil cooler without external plumbing and which regulates the oil delivered from the cooler to a substantially constant temperature.

It is a further object of my invention to provide a valve for controlling oil temperature in an oil cooling circuit that regulates properly under all the adverse conditions and is at the same time simple in design, practical and free from piston valves and free from inherent dangers of mechanical failures.

Other and further objects of my invention will appear from a more detailed description of the invention taken in connection with the drawings which form a part of this specification.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein are shown the preferred but obviously not necessarily the only embodiments of the invention, Fig. 1 is a diagrammatic view showing an internal combustion engine lubrication system embodying my invention.

Figure 2 is a side elevation view with parts in section, of a thermostatic control valve device embodying my invention shown in conjunction with a diagrammatic illustration of an oil cooler.

Figure 3 is a plan view of the thermostatic control valve shown in Fig. 2, without the oil cooler.

Figure 4 is an alternative arrangement of the valve poppet and seat using a single poppet valve instead of the double poppet shown in Fig. 2.

Figure 5 shows a modification of the device.

The invention has been illustrated in connection with an internal combustion engine which is provided with an oil circulating system including a temperature control unit forming the subject matter hereof.

Like parts are indicated by similar characters of reference throughout the several views.

The oil circulating system shown in Fig. 1 comprises an oil pump 2 between an engine 4 and a source of supply 6 for supplying oil to the engine under pressure; a pump 8 for withdrawing scavenged oil from the engine and returning the same to the source of supply, and an oil cooler and temperature control unit 10 through which the oil is passed after leaving the engine prior to its return to the source of supply.

Referring to Figs. 2 and 3, the unit 10 comprises a heat exchange member or radiator 14 for cooling the oil and a thermostatic valve 12 for regulating the amount of cooling.

The oil cooler, as illustrated herein, is of a well known type of ventilated cellular construction and does not per se constitute a part of my invention. The cooler or heat exchange unit essentially consists of a casing 15 enclosing a core 16, which affords multiple restricted passages for the flow of oil when being cooled, and a duct 18, which constitutes an unrestricted passage for the by-pass flow of oil when cooling is not required.

The passages 16 and 18 each communicate with a common inlet 24, but communicate with separate outlets 28 and 26 respectively from the heat exchange member. These outlets are formed in the flanges 22 and 20 to which the thermostatic valve 12 is mated and attached by means of the hold-down screws 17 which pass through the main housing 18 of the valve 12 and thus form a readily detachable means of securing the valve to the cooler or heat exchange member.

The main housing 18 of the valve 12 is formed with two inlet ports 30 and 32 and a single outlet port 34. An opening at the top of the valve is closed by the cap 36 and secured in place by the two screws 38 as well as by the four hold-down screws 17 which also pass through the cap.

The inlet port 32 of the valve housing communicates by means of the oil cooler outlet 28 with the restricted passages through cooling element or core 16, and is open at all times. The oil flowing through this inlet port 32 always has a free flow to the outlet port 34. This free flow of oil passage through the passage 40, formed by the outer walls of the main housing 18 and the partitions 42 and 43, into the chamber 44 containing the thermostatic element 46. It flows thence through the passage 48, also formed by the partitions 42 and the outer wall of the main housing 18, to the outlet port 34.

The other inlet port 30 communicates with the oil cooler outlet 26 and the unrestricted passage 18 from the inlet 24. Communication between the inlet port 30 and the chamber 50 is open or closed depending upon the position of the valve 52 with respect to the valve seat 54.

The chamber 50 is substantially circular in horizontal section with side walls formed by the outer walls of the main housing and by the partition 43. The lower part of the chamber comprises the valve seat 54 and the surrounding walls of the main housing 18 and the valve 52 when closed. The upper part of the chamber is formed by the ledge 56 which is a continuation of the partition 43 and likewise extends to the side walls of the main housing 18, and by the secondary valve 58 which under certain conditions operates to close the opening 60 in the ledge 56.

In the position shown in Fig. 2, both of the valves 52 and 58 are in an open position and the oil is free to flow through the port 30 into the chamber 50 and thence through the opening 60 into the chamber 44, where it circulates around the thermostatic element 46 together with the oil from the other inlet 32 and likewise passes through the passage 48 to the outlet port 34.

The valve 52 and the valve seat 54 comprise a double seated relatively balanced valve of the poppet type so arranged that the force required to close the valve is small in comparison with the flow area of the valve when it is open. The valve seat 54 comprises a lower annular shaped section which has a press fit at its outer periphery into the main housing. The inner circumference of the said valve seat 54 forms the inlet port 30. Supported directly above this inlet port 30 by the vertical supporting struts 64 is a disc shaped cover 66. Intermediate the outer edge of the disc shaped cover and the edge of the inlet port 30 is a circumferential opening 68 through which all the oil flowing through the port 30 must pass.

The valve poppet 52 is an annular ring or sleeve designed to close the said circumferential opening 68 when lowered to its closing position. Around the inner top edge of the valve ring is a circular seat 70 which mates with the seating surface 72 at the outer edge of the disc shaped cover 66. Around the lower edge of the annular valve ring comprising the valve poppet 52 is a seat 74 which mates with the seating surface 62 surrounding the port 30 and is a part of the valve seat 54. Thus when the valve poppet moves downward to closed position the seats 70 and 74 of the valve poppet 52 mate with the seating surfaces 72 and 62 and the opening 68 is tightly closed.

There is a free flow passage above and upward from the disc 66 through the center portion of the seat 70 of the valve poppet 52 and radially outward into the chamber 50 below the valve 58 and between the supporting members 57.

When the valve 52 is in closed position the effective opening pressure is exerted upon the difference between the area of the seats 70 and 74.

The valve is shown in the normal relatively balanced position and movement downward resulting from expansion of the thermostatic element 46 will move the poppet 52 to close the opening 68. The collapse of the thermostatic element 46 will raise the valve poppet 58 to a position where it closes the opening 60 in the ledge 56. The valve poppet 58 is a close fit in the circular opening 60, but must have clearance to permit assembly. Thus when the thermostatic element 46 is in the normal position as shown, either expansion or contraction of the element 46 will restrict the flow in one or the other of the openings 68 or 60, either one of which reduces the flow through the other since they are connected in series.

The cap 36 closes the top opening in the valve housing through which thermostatic element 46 is inserted and, as stated before, is held in place by the screws 38 and the hold-down screws 17 when attached to the cooler and otherwise by the screws 38 alone. The two screws 38 are threaded into the two lugs 76 and 78 which also serve as a stop for the shoulder 80 of the head or upper end of the thermostatic element.

The shoulder 80 is held against the stops 76 and 78 by the spring 82, which will permit the movement of the entire thermostatic element upward when the fluid pressure on the valve end exceeds the spring load. The recess 84 serves as a guide for the pilot 86 which locates the thermostatic element centrally with respect to the housing and valve seats.

The thermostatic element 46 is of a typical construction and comprises a corrugated flexible metal bellows or "Sylphon" 88, closed at the lower or valve end by the end plate 90. The end plate 90 has a threaded stud 92 for attaching the valve poppet 58 which is formed in one piece with the valve poppet 52 and the supporting members 57.

The end plate 90 also has a centrally located female thread to receive the post 94 which together with its enlarged end 96 serves both as a hold-down member for the spring and as a guide to align the two ends of the valve with each other.

The top end of the bellows is attached to the retainer end plate 98 which together with the cap 100 closes this end of the bellows. All seals are usually made with solder. The cap 100 is also threaded into the retainer end plate 98 and has the external pilot 86 previously mentioned and the inner guiding surface 102, which guides the enlarged head 96 of the stud 94.

The cap 100 is screwed against the shoulder 104 of the retainer end plate and this shoulder not only so locates the cap 100 but is of a smaller diameter than that of the member 102 and the enlarged end 96, and therefore forms a stop for the downward movement of the stud when the bellows expands and the internal spring 105 is compressed.

The retainer end plate 98 has the external ledge 80 previously mentioned, and internal spring retainer, which together with stud 94 compresses the spring 105 when the end plate 90 moves away from the retainer end plate 98. The surface 106 of the retainer end plate also forms a guide for the stud 94 together with the surface 102. Vent holes 108 are located in the retainer end plate 98.

The thermostatic element thus described forms a sealed expandable pressure chamber that is held in a collapsed position by the spring 105 and may be expanded by an internal pressure. The "Sylphon" is filled with ethyl chloride or other suitable fluid which upon being heated by the circulation of oil in the chamber 44 will build up the vapor pressure necessary to expand the element. In this particular case the "Sylphon" is filled entirely full and under sufficient pressure to partially expand the bellows and compress the spring until the valve is held in the normal balanced position as illustrated in Fig. 2.

With this construction and method of filling, the valve will expand from this neutral intermediate position to the hot position according to the ambient temperature when the temperature has varied sufficiently to cause an increase of pressure within the "Sylphon" sufficient to overcome the resistance of the spring 105. Thus there is a limited normal range through which the temperature may fluctuate before expanding the "Sylphon" and restricting the valve opening 68 with the poppet 52 as required under all normal operating conditions, and the opening 60 will never be closed by the valve poppet 58.

If for any reason, however, the bellows or any part of the pressure chamber develops a leak, the spring force will expel the fluid through this leak, the bellows will collapse, thereby causing the valve to close the opening 60. When this happens the valve will remain in this cooling position for the heat exchange member until the valve is repaired.

The operation of the valve in conjunction with the oil cooler is as follows:

When the oil is cold and below the regulating temperature of the thermostatic element, most of the oil passes through the by-pass passage 18 and the port 30. The other passage through the core 16 of the cooler and port 32 is open but the greater restriction of this path forces the oil through the open valves of the by-pass circuit.

As the oil warms up and reaches the regulating temperature, the flow of oil around the thermostatic member 46 will raise the temperature of the fluid therein and produce the vapor pressure required to expand the "Sylphon." As this expansion occurs the restriction through the opening 68 and between the associated valve seats increases to the point where oil flow is established through the restricted passage of the cooling core 16 and the port 32. This flow through the cooling radiator or core lowers the temperature of the oil flowing through the passage 40. Under normal operating conditions the temperature of the oil through the unrestricted and uncooled passage would rise to a temperature where the thermostatic element would be completely expanded, but as the element expands it forces more oil through the cooling elements and this continues until enough cooled oil through the passage 40 mixes in the chamber 44 with the oil from chamber 50 to establish an equilibrium. If the oil is too cold, the bellows will contract a bit and allow more oil to flow through the uncooled passage.

Figure 4 shows an alternative arrangement of double-seated poppet valves 52 and 54. In this arrangement the ledge 56 passage 60 are identical with Fig. 2 and the port 30 is identical with the port 30 of Fig. 2. The valve 53 in Fig. 4 controls the flow through the port 30 into chamber 50. It is shown in the open position and moves downward to restrict the opening 30. The outer diameter of valve 53 is a close fit in the opening 60 of ledge 56 and when the thermostatic element 46 collapses in case of leakage, as described above, the valve moves upward and the outer rim of valve 53 closes the opening 60 and thus provides cooling in the same manner as the valve arrangement in Fig. 2.

In the valve arrangement shown in Fig. 4 the ledge 56 is lowered below the thermostatic element 46 and the extension member 59 of the valve 53 spaces the valve head away from the element. The threaded end of the member 52 screws onto the threaded stud 92 of the end plate 90.

The location of the thermostatic element above the ledge 56 makes it more responsive to the average temperature in chamber 44 and less influenced by the temperature of the oil flowing through the chamber 50.

At the initial starting of the engine the oil within the radiator or core of the cooling unit, being cool and partially congealed or highly viscous, the warm oil returning from the engine following the line of least resistance will flow through the passage 18, transmitting some of its heat to the core or radiator and thawing the congealed oil therein. The control valve being in its normal open or intermediate balanced position permits free flow of the oil through the valve chamber and around the thermostatic control member and thence to the outlet. As the temperature of the oil returning from the engine increases, the "Sylphon" chamber is expanded to cause the valve to gradually approach its seat 54, thereby restricting the flow of warm oil therethrough and causing more and more of the warm oil to be diverted through the radiator or core of the cooler or heat exchange unit where it is subjected to cooling influence of circulating air or other cooling medium. If the oil temperature increases to a dangerous degree, the valve may be completely closed and the entire oil supply will be circulated through the radiator or cooler core. However, this would be an extreme condition not at all likely to occur. The thermostatic control member being simultaneously subjected to both the warm and cooled oil responds to the average temperature and does not effect sudden or extreme movements of the valve, but effects gradual opening and closing movement thereof as may be necessary to maintain the "composite" temperature of the intermingled warm and cool oil within a predetermined relatively narrow range as it is discharged from the unit. The circulation of cooled oil about the thermostatic member does, however, influence such member in opposition to the influence of the warm oil.

In the assembly of the device sufficient thermally responsive fluid is enclosed under ample pressure within the bellows or "Sylphon" to overcome the retractive influence of the spring and maintain the valve 58 unseated and the passage 60 open under all normal conditions of operation. From this position the device fluctuates to and from closing relation of the valve 52 with the seats 62 and 72 in accordance with fluctuations of temperature of the liquid adjacent the outlet opening. In event of failure of the thermal control means, either through leakage of the thermally responsive liquid or breakage of the "Sylphon", the spring reacts wholly independently of the temperature of the fluid to close the valve 58 and port 60, thus diverting the flow of fluid entirely through the heat exchange unit.

The primary purpose of the retractive function of the thermostatic device and actuated valve is as a safety device in event of failure of or damage to the apparatus, to thus prevent overheating of the engine lubricant.

The normal operation of the valve is within a range short of complete closure thereof. Its fluctuations are only sufficient to maintain a constant oil temperature by diverting more warm oil through the cooler as the temperature of the combined warm and cool oil increases, and diverting less warm oil therethrough as the temperature of the combined warm and cool oil decreases.

In Fig. 5 there is illustrated the commercial embodiment of the invention in which it is being manufactured. In this form of construction there is employed the single valve 53a similar to the valve 53 of Fig. 4, but effective to close the passage upon movement in one direction only. The spring 105 within the "Sylphon" abuts at its lower end against a stirrup or hanger 106' in lieu of the member 106 shown in Fig. 2, and at its upper end abuts a collar screw threaded upon the stem 94 in lieu of the integral head 96. The "Sylphon" assembly is subject to the yielding resistance of the spring 82', which corresponds to the spring 82 of the previously described embodiment of the invention. The purpose, function and result are those hereinbefore described.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprises the preferred form of several modes of putting the invention into effect, and the invention is therefore claimed in any of its forms or modifications within the legitimate and valid scope of the appended claims.

Having thus described my invention, I claim:

1. In combination with an oil cooler having a cooling passage and a by-pass passage, and outlets communicating with the respective passages, a valve housing having inlets registering with said outlets and also having a discharge port, a discharge passage within said housing extending from one of said inlets to said discharge port, the other inlet having direct communication with said discharge passage at a point between the first mentioned inlet and said discharge port, a valve operating to vary the restriction of the inlet which communicates with said bypass passage, a thermo-responsive element connected with said valve located adjacent the point of communication between said discharge passage and the first mentioned inlet and having a temperature related expansion stroke to actuate said valve, a stop to positively limit the expansion of said thermo responsive element, and a pre-compressed spring arranged to yield at a predetermined load and permit said valve to open while said thermo-responsive element is expanded against said stop.

2. In combination with an oil cooler having a cooling passage and a bypass passage, a valve housing having a chamber, two inlet passages connected therewith and an outlet passage for said chamber, one inlet passage having constant open communication with said cooling passage and the other inlet passage being connected with said bypass passage, thereby causing all oil flowing from said cooling passage and said bypass passage to said outlet to pass through said chamber, a valve to control the flow of fluid from said bypass passage to said chamber, a thermo-responsive device in said chamber connected with said valve to move the same toward and from its closing position under predetermined temperature conditions in said chamber, said thermo-responsive device being movable as a unit with relation to said inlet, and means for opposing the unitary movement of said thermo-responsive device, said means being yieldable to permit said thermo-responsive device to move as a unit in a direction to open said valve when said valve is subjected to excessive pressure and while said thermo-responsive device remains in its expanded condition.

3. In combination with an oil cooler having a cooling passage and a bypass passage, a housing having a chamber provided with two inlets and a separate outlet, one of said inlets having constantly open communication with said cooling passage and the other of said inlets being connected with said bypass passage, the arrangement being such that all oil flowing from said oil cooler to said outlet must pass through said chamber, valve means to control the flow of fluid from said bypass passage to said chamber, and a thermo-responsive element operatively connected with said valve means and located in said chamber to actuate said valve in accordance with the temperature of the fluid entering said chamber through either or both of said inlets.

4. A controlling device for an oil cooler having a cooling passage and a bypass passage and spaced outlets for the respective passages, said device comprising a housing mounted on said oil cooler and provided with a chamber, an inlet passage having constantly open communication with the outlet of said cooling passage and with said chamber, a second inlet passage leading from said bypass passage to said chamber, and a separate discharge passage for said chamber, whereby all oil flowing from said oil cooler to said outlet must pass through said chamber, a valve to control the flow of fluid from said bypass passage to said chamber, and a bellows mounted in said chamber, containing a thermo-responsive fluid and operatively connected with said valve to actuate the latter in accordance with variations in the temperature of the fluid entering said chamber through either or both of said inlet passages.

5. In combination with an oil cooler having a cooling passage and a bypass passage, a housing mounted on said cooler and having a chamber, an inlet passage connecting said chamber with the bypass passage of said cooler, and an outlet passage, a bellows mounted within said chamber and containing a temperature responsive fluid in a quantity sufficient at normal low temperatures to prevent the contraction of said bellows beyond a predetermined partially extended position, spring means arranged within said chamber to yieldably resist the expansion of said bellows beyond said partially expanded position and to move the same to a position of expansion less than said partially expanded position upon the escape of temperature responsive fluid from said bellows, and valve means connected with said bellows to restrict the flow of oil from said bypass passage to said chamber and movable to flow restricting position upon the movement of said bellows to an expanded position substantially beyond said partially expanded position or to a position of less expansion than said partially expanded position.

6. In combination with an oil cooler having a cooling passage and a bypass passage, a housing mounted on said cooler and having a chamber, an inlet passage connecting said chamber with the bypass passage of said cooler, and an outlet passage, a bellows mounted within said chamber and containing a temperature responsive fluid in a quantity sufficient at normal low temperatures to prevent the contraction of said bellows beyond a predetermined partially expanded position, spring means arranged within said chamber to yieldably resist the expansion of said bellows beyond said partially expanded position and to move the same to a position of expansion less than said partially expanded position upon the escape of temperature responsive fluid from said bellows, and a poppet valve connected to the movable end of said bellows in fixed relation thereto to restrict the flow of oil from said bypass passage to said chamber upon the expansion of said bellows substantially beyond said partially expanded position and to similarly restrict said flow upon the contraction of said bellows to a position of expansion less than said partially expanded position.

7. In combination with an oil cooler having a cooling passage and a bypass passage and having separate outlets for said passages, a housing mounted on said oil cooler and having a chamber, two inlet passages connecting said chamber respectively with said cooling passage and said bypass passage, and an outlet passage, whereby all oil flowing from said oil cooler to said outlet passage must flow through said chamber, a bellows mounted within said chamber containing a temperature responsive fluid in a quantity sufficient at normal low temperatures to positively prevent the contraction of said bellows beyond a pretermined partially expanded position, spring means arranged within said chamber to yieldably resist the expansion of said bellows beyond said partially expanded position and to move the same to a position of expansion less than said partially expanded position upon the escape of temperature responsive fluid from said bellows, and a poppet valve arranged in said housing to control the flow of oil from said housing to said chamber and connected with said bellows for movement thereby to a position to prevent such flow when said bellows is either expanded to a position substantially beyond said normally partially expanded position or contracted to a position of expansion less than said normal partially expanded position.

8. In combination with an oil cooler having a cooling passage and a bypass passage, a housing mounted on said cooler and having a chamber, an inlet passage connecting said chamber with the bypass passage of said cooler, and an outlet passage, a bellows mounted within said chamber and containing a temperature responsive fluid in a quantity sufficient at normal low temperatures to prevent the contraction of said bellows beyond a predetermined partially expanded position, spring means arranged within said chamber to yieldably resist the expansion of said bellows beyond said partially expanded position and to move the same to a position of expansion less than said partially expanded position upon the escape of temperature responsive fluid from said bellows, and valve means connected with said bellows in fixed relation to the movable end thereof and controlled thereby to restrict the flow of oil from said bypass passage to said chamber upon the expansion of said bellows substantially beyond said partially expanded position, and means to similarly restrict said flow controlled by the movement of said bellows to a position of expansion less than said partially expanded position.

9. In an apparatus for regulating the flow of fluid through a passage in response to variations in the temperature of the fluid, a housing having a chamber, an inlet and an outlet therefor, a poppet valve to control the flow of fluid through said inlet having two closed positions and an intermediate open position, a thermo-responsive device in said chamber comprising a bellows containing temperature responsive fluid in sufficient quantity to prevent the contraction of said bellows beyond a predetermined partially expanded position at normal low temperatures, a spring within said bellows to yieldably resist the expansion of said bellows beyond said partially expanded position and to move said bellows to a position of expansion less than said normal partial expansion upon the escape of temperature responsive fluid from said bellows, and an operative connection between said bellows and said valve to move the latter to one closed position when said bellows has expanded a predetermined distance beyond said normal partially expanded position and to move said valve to its other closed position when said bellows is moved to a position of expansion less than said normal partial expansion.

10. In an apparatus for regulating the flow of fluid through a passage in response to variations in the temperature of the fluid, a housing having a chamber, an inlet passage and an outlet passage for said chamber, said inlet passage having two axially spaced valve seats, a poppet valve having parts arranged to cooperate with the respective valve seats to close said inlet passage, a thermo-responsive device in said chamber including a bellows operatively connected with said valve to move the latter toward and from the respective valve seats, said bellows containing temperature responsive fluid in sufficient quantity to prevent the contraction of said bellows beyond a predetermined partially expanded position at normal low temperatures with said valve in an intermediate position between said valve seats, and a spring within said bellows to resist the expansion of said bellows beyond said partial expanded position to move said valve toward one of said valve seats, and to move said bellows to a position of expansion less than said normal partial expansion upon the escape of temperature responsive fluid from said bellows and thereby move said valve toward the other of said valve seats.

11. In an apparatus for regulating the flow of fluid through a passage in response to variations in the temperature of the fluid, a housing having therein a chamber, an inlet port and a discharge passage, and a second chamber interposed between said inlet port and the first mentioned chamber and having a port leading to said first mentioned chamber, a valve seat arranged about said inlet port, a baffle rigidly supported above and in spaced relation to said inlet port and having a circumferential edge portion forming a valve seat, an annular valve member arranged about and spaced from said baffle and axially movable relation thereto, said valve member having upper and lower parts spaced one from the other to cooperate with the respective valve seats, a second valve member rigidly connected with the first mentioned valve member and adapted to close the port between the two chambers, a thermo-responsive device in the first mentioned chamber comprising a bellows operatively connected with said valve members and containing temperature responsive liquid in sufficient quantity to prevent the contraction of said bellows beyond a predetermined partially expanded position at normal low temperatures with both valve members in port opening positions, and a spring within said bellows to resist the expansion of said bellows beyond said normal partially expanded position to move said annular valve member toward port closing position, and to move said bellows to a position of expansion less than said normal partial expansion upon the escape of temperature responsive liquid from said bellows and thereby move said second valve member to port closing position.

12. In an apparatus for regulating the flow of fluid through a passage in response to variations in the temperature of the fluid, a housing having therein a chamber, an inlet port leading to said chamber and a discharge passage, a seat arranged about said port, a baffle rigidly supported above and in spaced relation to said port and having an edge portion forming a valve seat, an annular valve member arranged about and spaced from said baffle and axially movable with relation thereto, said valve member having axially spaced parts arranged to cooperate with the respective valve seats, and a thermo-responsive element mounted in said chamber and operatively connected with said valve member and having means for moving the latter into closing engagement with either of said valve seats.

WELDON WORTH.